June 27, 1967

D. H. WILLIS 3,328,519

LUMINANCE AMPLIFIER CIRCUITRY FOR A COLOR TELEVISION AMPLIFIER

Filed May 14, 1965

INVENTOR.
DONALD H. WILLIS
BY Eugene M. Whitacre
Attorney 3,328,519

LUMINANCE AMPLIFIER CIRCUITRY FOR A COLOR TELEVISION AMPLIFIER

Donald H. Willis, Indianapolis, Ind., assignor to Radio Corporation of America, a corporation of Delaware Filed May 14, 1965, Ser. No. 455,706
12 Claims. (Cl. 178—5.4)

Figures 1, 2:
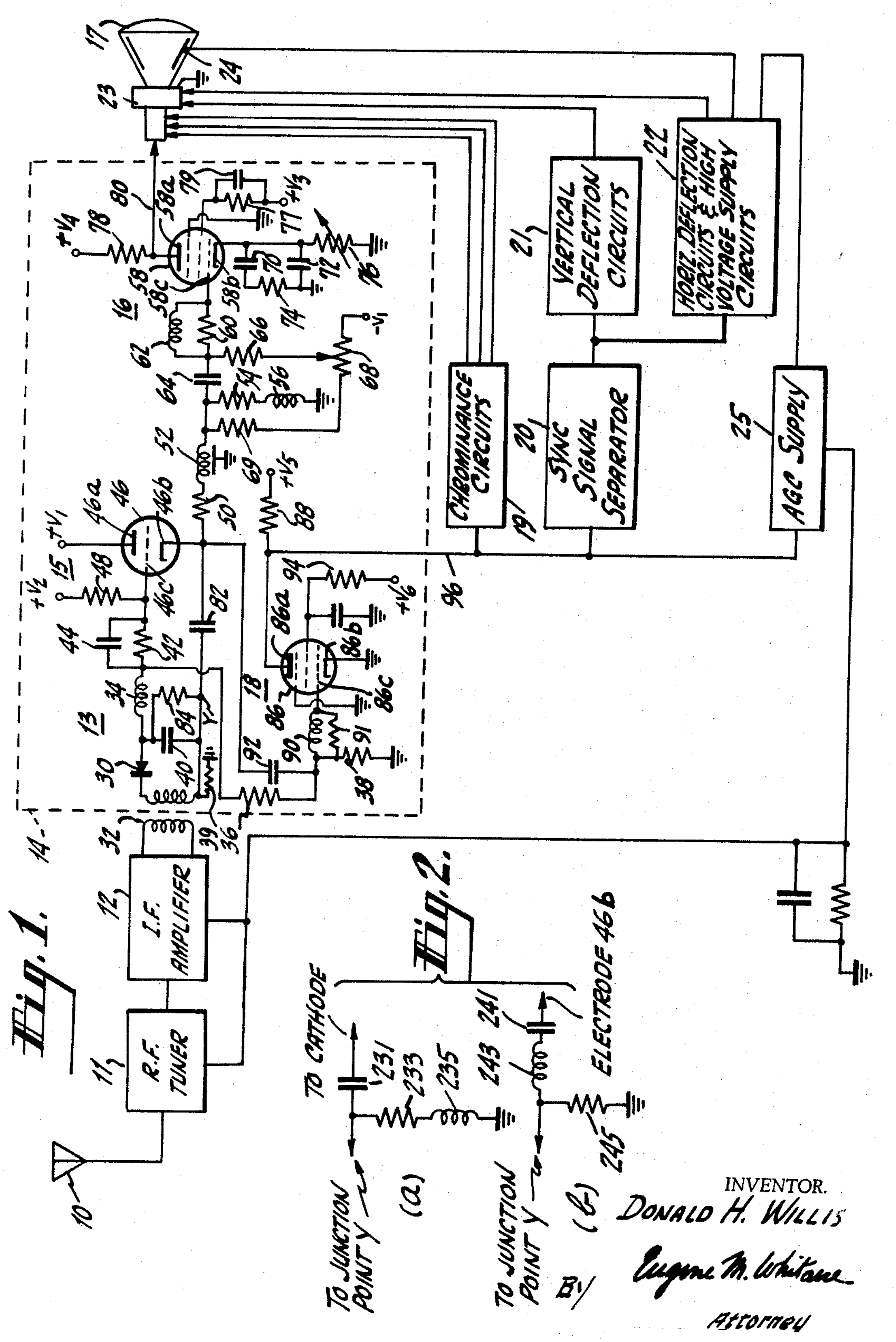

This invention relates to video amplifier circuits and, more particularly, to such circuits for use in the luminance channel of a color television receiver.

In presently available color television receivers, there is a channel for translating the luminance signals and a channel for translating the chrominance signals. The luminance signals, which convey brightness information and which correspond to the conventional monochrome signals, are coupled to suitable elements, such as the cathodes, of a three gun picture tube to reproduce a black and white picture on the screen of the tube. The chrominance signals, which convey the color aspects of the image, are handled in such a manner as to derive three color control signals therefrom. These signals are then coupled to the control grids of the three gun tube to add color information to the black and white picture.

As is well known, the bandwidth of the luminance channel is appreciably greater than the bandwidth of the chrominance channel. Because of this difference in bandwidth a greater time delay is introduced into the narrow band chrominance channel than is introduced into the wide band luminance channel. As a result, luminance and chrominance signals which enter the video processing circuits together will be delivered out of phase to the picture tube unless something is done to equalize the delay in the different paths. It is conventional practice, therefore, to include a video delay network in the luminance channel to equalize the time delays of the two channels so that the luminance information will arrive at the picture tube in time coincidence with the chrominance information.

One such compensating arrangement known in the prior art employs a video delay line connected between the video detector and the video amplifier of the luminance channel. Such an arrangement, however, does not yield optimum results. This is because the video diode detector performs best when working into a fairly high impedance load but a video delay line of relatively high impedance does not provide a substantially linear phase response or a reasonably uniform amplitude response over the frequency range of the luminance channel. On the other hand, were the delay line to be of a relatively low impedance so as to provide satisfactory phase and amplitude response characteristics, it would not represent an adequate load into which the diode detector must work.

In accordance with the present invention, there is provided a luminance channel for use in a color television receiver having a chrominance channel which introduces a time delay of a predetermined amount in the translation of chrominance signal information to the picture tube thereof. The arrangement includes a video detector means for supplying luminance signal information and a first video amplifier stage coupled to the video detector to operate as a cathode follower for low frequency luminance signal information and as a "boot strap amplifier" for high frequency luminance and chrominance signal information. The arrangement additionally includes a second video amplifier and, also, means including a time-delay network exhibiting a time delay substantially equal to that of the chrominance channel for applying the luminance signal developed at the cathode of the first video amplifier stage to the input electrode of the second video amplifier stage. Circuits embodying the invention provide a convenient means for peaking the higher frequency components at the luminance signal to establish desired "overshoot effects" of the luminance signal to match the "precede" effects of the signal and hence result in an image presentation with certain desirable characteristics such as greater detail.

In accordance with a feature of the invention, the luminance signal from the video detector and the higher frequency luminance signal components and chrominance signal components from the cathode of the first video amplifier stage are applied to an amplifier for driving the chrominance circuits, and also if desired, the automatic gain control and synchronizing signal separation circuits.

For a better understanding of the present invention, together with further objects thereof, reference is had to the following description, taken in connection with the accompanying drawings, and its scope will be pointed out in the appended claims.

Referring to the drawings:

FIGURE 1 is a schematic circuit diagram, partly in block form, of a color television receiver embodying a particular form of the present invention; and FIGURES 2(*a*) and 2(*b*) illustrate portions of modified embodiments, also constructed according to the invention.

Referring now more particularly to FIGURE 1 of the drawings, there is represented a color television receiver of the type utilizing a "three-gun" display device or picture tube and including luminance amplifier circuitry constructed in accordance with the invention. In the color television receiver, the incoming composite signal from the broadcast transmitter is received at the antenna 10 and applied to the radio frequency (R.F.) tuner 11. Tuner 11 is of suitable construction and may include, for example, a radio frequency amplifier for amplifying the received composite television signal and a heterodyne oscillator and mixer for converting the frequency of the main television carrier to an intermediate frequency. The television signal is then coupled via an intermediate frequency (I.F.) amplifier 12 to a video detector circuit 13 included within the dotted rectangle 14. Detector circuit 13 is effective to recover the video and subcarrier frequency components from the intermediate frequency signal and to produce a composite color television video signal output including luminance and chrominance signal information. The luminance signal components are coupled via a first video amplifier 15 and a second video amplifier 16 shown within the rectangle 14 to the "three gun" picture tube 17, which may be of the shadow mask variety. More particularly, these signals are coupled to the cathodes of the picture tube 17 to intensity modulate the three electron beams thereof. Video detector 13, first video amplifier 15 and second video amplifier 16 may therefore be considered to comprise the luminance channel of the color television receiver.

The luminance signal components are also coupled from detector circuit 13 to a pentode amplifier 18 included within the rectangle 14. The chrominance signal components of the composite color television video signal are coupled via the first video amplifier 15 and the amplifier 18 to the chrominance circuits 19 of the television receiver. These circuits include the usual chrominance amplifier, reference signal oscillator, and color demodulators for deriving the color control signals for the picture tube 17. These signals are coupled to the control grids of the three electron guns of the tube 17 to introduce the gradations of the red, blue, and green primary colors used in the additive system in the synthesizing of the color image. Video detector 13, first video amplifier 15, amplifier 18 and chrominance circuits 19 may be considered to comprise the chrominance channel of the color television receiver.

A synchronizing signal separator 20 is coupled to the output of amplifier 18 to develop and supply synchronizing signals to the deflection system of the receiver. This system includes the vertical deflection circuits unit 21 and the horizontal deflection circuits unit 22, which respectively supply field scanning and line scanning signals to the deflection yoke 23 of the picture tube 17. Unit 22, additionally includes a high voltage power supply which provides the operating potential required by the high voltage anode 24 of the tube 17.

An automatic gain control (A.G.C.) supply circuit unit 25 is further coupled to the output of amplifier 18 to develop and supply gain control signals to the R.F. amplifier in the tuner 11 and to the I.F. amplifier 12. A.G.C. unit 25 may be of the variety that is keyed by pulse signals supplied from the horizontal deflection circuits in unit 22.

A sound reproducing channel (not shown) is also coupled to the output of the I.F. amplifier 12 for recovering the intercarrier sound signals as is known.

More particular consideration will now be given to that portion of the color television receiver of FIGURE 1 which includes the luminance amplifier circuitry of the present invention. This circuitry may be found in the dotted rectangle 14. The luminance amplifier circuitry includes, first of all, the aforementioned video detector 13. Detector 13 includes a diode 30 inductively coupled by means of a coupling transformer 32 to the I.F. amplifier 12. The load circuit of the diode 30 comprises essentially the resistor 84 in parallel with the series combination of resistors 36, 38 and 39. The load resistor 84 is bypassed for I.F. signals by a capacitor 40. A series peaking coil 34, and if desired, a 4.5 mc. sound trap, not shown, in series with a parallel resistor 42, capacitor 44 network couples the anode of detector diode 30 to the input terminal of the first video amplifier 15. The amplifier 15 includes a triode type vacuum tube 46 having anode, cathode and control grid electrodes **46*a*, 46*b*, and 46*c* respectively. The anode electrode 46*a* is, as shown, directly connected to a source of operating potential $+V_1$, while the control grid electrode 46*c* is connected to a source of bias potential $+V_2$ via resistor 48 and, also, to the resistor-capacitor network 42, 44. The control grid electrode 46*b* will hereinafter be referred to as the output terminal of the first video amplifier 15 while the cathode electrode 46*b* will hereinafter be referred to as the output terminal of the amplifier 15**.

Connected in the output circuit of the amplifier 15, i.e., to the cathode electrode **46*b*, is a resistor 50 and a time delay network shown symbolically by the reference numeral 52. Delay network 52 comprises a video delay line having a substantially linear phase response and a reasonably uniform amplitude response over the transmission range of the luminance channel. As was previously mentioned, such a delay line is a relative low impedance device, of the order of 600 ohms, and is properly terminated at its far end by a resistor 54 and an inductor 56 so as to minimize reflections that would tend to destroy fidelity of translation through the line. The length of the line 52** in an electrical sense is so chosen as to introduce a time delay in the luminance channel such that the translation time through the luminance channel substantially equals that through the chrominance channel.

The luminance amplifier circuitry of the present invention further includes a second video amplifier 16 having a pentode type vacuum tube 58. The control grid **58*c* or input terminal of the tube 58 is serially connected to the delay line 52 via the parallel combination of a resistor 60 and inductor 62, and via a direct current (D.C.) blocking capacitor 64. These components comprise a means for coupling the A.C. components of the luminance signal developed at the output terminal 46*b* of the amplifier stage 15 to the grid 58*c*. The control grid 58*c* is also connected to the delay line 52 via the network 60, 62, a resistor 66, a potentiometer 68, and a resistor 69. These components comprise a means for coupling the D.C. components of the luminance signal developed at the output terminal 46*b* to the grid 58*c*. Potentiometer 68 also serves the purpose of a brightness control. The cathode electrode 58*b* of the tube 58 is grounded via a self-biasing network including capacitors 70 and 72 and resistor 74 and via a potentiometer 76, included for purposes of contrast control. The screen grid electrode is connected to a source of operating potential $+V_3$ via the filter network 77, 79 while the suppressor grid electrode is grounded. The anode electrode 58*a* is connected to a source of operating potential $+V_4$ via a video load represented by the resistor 78 and, also, via the conductor 80 to the picture tube 17**.

The luminance amplifier circuitry finally includes an A.C. impedance, such as coupling capacitor 82, and a resistor 84 serially connected between the cathode electrode **46*b* of the amplifier 15 and the junction between the diode 30 and peaking coil or inductor 34 of the video detector 13**.

The described luminance channel operates to translate the luminance signal components from the video detector 13 through the video amplifier 16 to the picture tube 17. The video delay line 52 introduces the time delay required to cause the luminance and chrominance signal information to reach the picture tube 17 with the proper time synchronization. The amplifier 15 which operates as a cathode follower for low frequency luminance signal components and as a 'boot strap amplifier" for higher frequency luminance and for chrominance signal components provides the advantage that the video diode detector 13 can operate into its desired high impedance load comprising the resistor 84 in parallel with the series combination of resistors 36, 38 and 39 while a low impedance delay line can be used, along with its desired amplitude and frequency response characteristics. The detected video signals developed across the resistors 36 and 38 are applied between the control grid electrode **46*c* and ground as a signal input circuit for the cathode follower type of operation while the video signals developed across the resistors 36, 38 and 39 are coupled between the grid 46*c* and the cathode 46*b* (through capacitor 82**) to provide the input circuit for the "boot strap" type of operation.

By virtue of the "boot strap" circuit configuration for the higher frequency signals, a greater signal amplification or peaking of the higher frequency luminance signal components as welel as the chrominance signal components is achieved relative to the lower frequency luminance components. As a practical matter the peaking of the amplifier 15 response, considering the nature of the low impedance load circuit thereof, is ordinarily of the order of 1.5 to 2.5 mc., but may be of a higher frequency depending on the design of the amplifier load circuit.

The peaking of the high frequency luminance components has the desirable effect of permitting control of "overshoots" to match "precedes" which together with the increased video bandwidth results in a reproduced image having, among other desirable characteristics, greater detail. "Precedes" and "overshoots" refer to amplifier transient response characteristics associated with transitional conditions of signals representative of white scene areas to signals representative of black or darker scene areas and vice versa, respectively. The overshoots are primarily controlled by the peaking characteristics of the video amplifier while the precedes are primarily a function of phase shifts of certain frequencies in the I.F. amplifier 12 and delay line 52.

A pentode amplifier 18 is further included within the dotted rectangle 14 to provide signals used for purposes of synchronization, gain control, and chrominance processing. Amplifier 18 includes a pentode type vacuum tube 86 having anode, cathode and control grid electrodes **86*a*, 86*b*, 86*c* respectively. The anode electrode 86*a* is coupled to a source of operating potential $+V_5$ via a load resistor 88 while the cathode electrode 86*b* is connected to ground. The control grid electrode 86c or input terminal of the amplifier 18 is coupled via a peaking inductor 90 and a coupling capacitor 92 to the cathode electrode 46b of the amplifier tube 46**.

The inductor 90 is series resonant with the input capacitance of the tube 86 at a frequency above the color subcarier frequency to enhance the upper color subcarrier sidebands which tend to be attenuated by the frequency response characteristics of the I.F. amplifier 12. A resistor 91 is connected in parallel with the inductor 90 to control the Q of the series resonant circuit to insure stability of the amplifier 18 against spurious oscillation. The inductor 90 and capacitor 92 comprise an A.C. path for the chrominance signals developed at the cathode of amplifier 15. The control grid electrode 86c is also coupled via the inductor 90 and the previously mentioned resistors 36 and 38 to the inductor 34 in the video detector 13. These units comprise a D.C. path for the lower frequency luminance signals supplied by the detector 13. The screen grid electrode of the tube 86 is coupled via a resistor 94 to a source of operating potential $+V_6$ while the suppressor grid electrode is connected to ground.

In the operation of amplifier 18, luminance signals developed by video detector 13 across the resistor 38 are applied to the control grid 86c of the amplifier tube 86. High frequency luminance signals and chrominance signals developed by amplifier 15 are also supplied to the control grid electrode 86c of the amplifier tube 86 via capacitor 92. Amplifier tube 86 and its associated components are so chosen that the resulting output luminance signals produced at the anode electrode 86a are of sufficient amplitude and polarity to drive the synchronizing and gain control units of the color television receiver. They are also so chosen that the resulting chrominance signals are of sufficient amplitude to drive the chrominance processing circuits of the receiver. These output luminance and chrominance signals are coupled along the conductor 96 to the chrominance circuit unit 19, the synchronizing signal separator unit 20 and the A.G.C. supply unit 25. Appropriate "take-off" circuits are provided in each of those units to respond only to the drive signals desired by each respective unit.

The gain provided by the boot strap operation of the first video amplifier 15 in the generation of the chrominance signal, and the further gain provided by the amplifier 18 are such as to reduce the need for the high gain chrominance and burst amplifiers normally included within the chrominance circuits unit 19. The combination of the amplifying features provided by these two components therefore permits less expensive components and simpler arrangements to be used in the chrominance channel. This feature represents yet another advantage of the present invention. It also provides a simple and convenient method of amplifying the luminance signals so that effective synchronization and gain control functions can be performed in the receiver.

In FIGURE 1, a capacitor 82 is used as part of the coupling arrangement for applying the higher frequency components between the grid 46c and the cathode 46b to permit the boot strap operation of amplifier 15 for these components. The capacitor 82 is, as shown, connected between the cathode electrode 46b and the junction point Y with the resistor 84 connected between the junction point Y and the junction between the diode 30 and the inductor 34 of the video detector 13. The present invention is not limited to this particular coupling arrangement for coupling the tube 46 to operate as a boot strap amplifier for the higher frequency video signals. Any number of coupling arrangements can be used, provided they each operate to substantially couple only the high frequency components of the luminance signal and the chrominance signal components to the cathode 46b. Two such substitute arrangements are partially illustrated in FIGURE 2.

(A) FIGURE 2(*a*) shows an L-section filter comprising a capacitor 231, a resistor 233, and an inductor 235 which may replace the capacitor 82. One side of capacitor 231 is connected, as indicated, to the cathode electrode 46b of the triode 46 while the other side is connected to the junction point Y. Resistor 233 and inductor 235 are serially connected between this same junction point Y and ground.

(B) FIGURE 2(*b*) shows a second L-section filter configuration, comprising a capacitor 241, an inductor 243, and a resistor 245. Capacitor 241 and inductor 243 are serially connected between the cathode electrode 46b of the triode 46 and the junction point Y while resistor 245 is connected between the junction point Y and ground.

Each L-section configuration of FIGURE 2, in conjunction with resistors 36, 38 and 39 of FIGURE 1, couples the high frequency components of the luminance signal and the chrominance signal components between the grid 46c and cathode 46b. In addition, each provides for flexibility in the selection of the desired amplification and phase response characteristics of the cathode follower stage 15. The desired amplification and phase response characteristics of the amplifier 15 may be effected by proper selection of the values for the components of the particular configuration used. As mentioned above, the response characteristics of the first video amplifier 15 enables control over "overshoots" so as to match "precedes" as well as increased bandwidth which results in a picture with greater detail.

It will be apparent to one skilled in the art that whereas the present invention has been described using vacuum tube components, its teachings are equally applicable in an environment in which transistors are used. It will also be apparent that, in this vacuum tube environment, the term "boot strap amplifier" applies to an amplifier arrangement in which an input signal is applied between the control grid and cathode electrode of the amplifier tube whereas an output signal is developed between the cathode electrode and ground.

What is claimed is:

1. A luminance channel for a color television receiver having a chrominance channel which introduces a time delay of a predetermined amount in the translation of chrominance signal information to the picture tube thereof, said luminance channel comprising:

video detector means including a load impedance element for developing video frequency signal information;

an amplifier stage including an amplifier device having a control electrode and a further pair of electrodes;

load impedance means for said amplifier stage including a time-delay network exhibiting a time delay of said predetermined amount;

means for applying at least a portion of the low video frequency signal components developed across the load impedance element of said video detector between said control electrode and one of said further pair of electrodes, for causing said amplifier to operate as a follower amplifier for the lower video frequency components;

means including a capacitor for applying at least a portion of the higher video frequency signal components developed across the load impedance element of said video detector between said control electrode and the other of said further pair of electrodes for causing said amplifier to operate at higher gain for the higher video frequency signal components, and utilization circuit means coupled to said other of said further pair of electrodes through said time delay network.

2. A luminance channel for a color television receiver according to claim 1 in which said amplifier device is a vacuum tube and wherein said control electrode represents the control grid electrode thereof, said one of said further pair of electrodes represents the anode electrode thereof, and said other of said further pair of electrodes represents the cathode electrode thereof.

3. A luminance channel for a color television receiver according to claim 2 in which said amplifier is caused to operate as a cathode follower amplifier for the lower video frequency components and as a bootstrap amplifier for the higher video frequency components.

4. A luminance channel for a color television receiver having a chrominance channel which introduces a time delay of a predetermined amount in the translation of chrominance signal information to the picture tube thereof, said luminance channel comprising:

video detector means including a load impedance element for developing video frequency signal information;

an amplifier stage including an amplifier device having a control electrode and a further pair of electrodes;

load impedance means for said amplifier stage including a time-delay network exhibiting a time delay of said predetermined amount;

means for applying at least a portion of the low video frequency signal components developed across the load impedance element of said video detector between said control electrode and one of said further pair of electrodes, for causing said amplifier to operate as a follower amplifier for the lower video frequency components;

means including an L-section filter for applying at least a portion of the higher video frequency signal components developed across the load impedance element of said video detector between said control electrode and the other of said further pair of electrodes for causing said amplifier to operate at higher gain for the higher video frequency signal components, and utilization circuit means coupled to said other of said further pair of electrodes through said time delay network.

5. A luminance channel for a color television receiver according to claim 4 in which said L-section filter includes a capacitor having a first side connected to said other of said further pair of electrodes and a second side connected to said load impedance element and in which said L-section filter also includes a resistor and inductor connected in series between said second side of said capacitor and ground potential.

6. A luminance channel for a color television receiver according to claim 4 in which said L-section filter includes a capacitor and inductor serially connected between said other of said further pair of electrodes and said load impedance element and in which said L-section filter also includes a resistor connected between the junction of said inductor with said load impedance element and ground potential.

7. A luminance channel for a color television receiver having a chrominance channel which introduces a time delay of a predetermined amount in the translation of chrominance signal information to the picture tube thereof, said luminance channel comprising:

video detector means including a load impedance element for developing video frequency signal information;

an amplifier stage including an amplifier device having a control electrode and a further pair of electrodes;

load impedance means for said amplifier stage including a time-delay network properly terminated at one end exhibiting a time delay of said predetermined amount;

means for applying at least a portion of the low video frequency signal components developed across the load impedance element of said video detector between said control electrode and one of said further pair of electrodes, for causing said amplifier to operate as a follower amplifier for the lower video frequency components;

means including a capacitor for applying at least a portion of the higher video frequency signal components developed across the load impedance element of said video detector between said control electrode and the other of said further pair of electrodes for causing said amplifier to operate at higher gain for the higher video frequency signal components, and utilization circuit means coupled to said other of said further pair of electrodes through said time delay network.

8. A luminance channel for a color television receiver having a chrominance channel which introduces a time delay of a predetermined amount in the translation of chrominance signal information to the picture tube thereof, said luminance channel comprising:

video detector means including a load impedance element for developing video frequency signal information;

an amplifier stage including an amplifier device having a control electrode and a further pair of electrodes;

load impedance means for said amplifier stage including a time-delay network exhibiting a time delay of said predetermined amount;

means for applying at least a portion of the low video frequency signal components developed across the load impedance element of said video detector between said control electrode and one of said further pair of electrodes, for causing said amplifier to operate as a follower amplifier for the lower video frequency components;

means including a capacitor for applying at least a portion of the higher video frequency signal components depeloped across the load impedance element of said video detector between said control electrode and the other of said further pair of electrodes for causing said amplifier to operate at higher gain for the higher video frequency signal components, and utilization circuit means coupled to said other of said further pair of electrodes through said time delay network and an A.C. coupling connection and through said time delay network and a D.C. coupling connection.

9. A luminance channel for a color television receiver according to claim 8 in which said D.C. coupling connection includes a brightness control potentiometer.

10. In a color television receiver having a chrominance channel which introduces a time delay of a predetermined amount in the translation of chrominance signal information to the picture tube thereof, apparatus comprising:

video detector means including a load impedance element for developing luminance signal information and chrominance signal information;

an amplifier stage including an amplifier device having a control electrode and a further pair of electrodes;

load impedance means for said amplifier stage including a time-delay network exhibiting a time delay of said predetermined amount;

means for applying at least a portion of the low frequency luminance signal information developed across the load impedance element of said video detector between said control electrode and one of said further pair of electrodes, for causing said amplifier to operate as a follower amplifier for the said low frequency signal information;

means including a capacitor for applying at least a portion of the high frequency luminance signal information and chrominance signal information developed across the load impedance element of said video detector between said control electrode and the other of said further pair of electrodes for causing said amplifier to operate at higher gain for the said high frequency signal information;

utilization circuit means coupled to said other of said further pair of electrodes through said time delay network, and further utilization circuit means A.C. coupled to said other of said further pair of electrodes.

11. Apparatus according to claim 10 in which said further utilization circuit means is also D.C. coupled to said load impedance element of said video detector.

12. In a color television receiver having a chrominance channel which introduces a time delay of a predetermined amount in the translation of chrominance signal information to the picture tube thereof, apparatus comprising:

video detector means including a load impedance element for developing luminance signal information and chrominance signal information;

a first amplifier stage including a first vacuum tube having a control grid electrode, an anode electrode, and a cathode electrode;

load impedance means for said amplifier stage including a time-delay network exhibiting a time delay of said predetermined amount;

means for applying at least a portion of the low frequency luminance signal information developed across the load impedance element of said video detector between said control grid electrode and said anode electrode for causing said vacuum tube to operate as a cathode follower amplifier for the said low frequency signal information;

means including a capacitor for applying at least a pc tion of the high frequency luminance signal inform tion and chrominance signal information develop across the load impedance element of said video c tector between said control grid electrode and sa cathode electrode for causing said vacuum tube operate as a bootstrap amplifier for the said high fı quency signal information;

a second amplifier stage including a second vacuu tube having a control grid electrode coupled to t cathode electrode of said first vacuum tube throu said time delay network, and a third amplifier stage including a third vacuum tul having a control grid electrode A.C. coupled to tl cathode electrode of said first vacuum tube and D. coupled to said load impedance of said video detectc

References Cited

UNITED STATES PATENTS

| | | | |
|---|---|---|---|
| 2,999,897 | 9/1961 | Heuer et al. | 178—5 |
| 3,037,071 | 5/1962 | Schaefer et al. | 178—5 |
| 3,128,334 | 4/1964 | Heuer | 178—5 |
| 3,223,938 | 12/1965 | Brook | 330—1 |

DAVID G. REDINBAUGH, *Primary Examiner.*

J. O'BRIEN, *Assistant Examiner.*